US012653110B2

(12) United States Patent
Biggs

(10) Patent No.: US 12,653,110 B2
(45) Date of Patent: Jun. 16, 2026

(54) BIN VENT APPARATUS AND METHODS

(71) Applicant: Grain Processing Corporation, Muscatine, IA (US)

(72) Inventor: Derek S. Biggs, Muscatine, IA (US)

(73) Assignee: Grain Processing Corporation, Muscatina, IA (US)

( * ) Notice: Subject to any disclaimer, the term of this patent is extended or adjusted under 35 U.S.C. 154(b) by 199 days.

(21) Appl. No.: 18/288,593

(22) PCT Filed: Jun. 2, 2023

(86) PCT No.: PCT/US2023/024233
§ 371 (c)(1),
(2) Date: Oct. 27, 2023

(87) PCT Pub. No.: WO2023/239597
PCT Pub. Date: Dec. 14, 2023

(65) Prior Publication Data
US 2024/0407302 A1     Dec. 12, 2024

Related U.S. Application Data

(60) Provisional application No. 63/349,332, filed on Jun. 6, 2022.

(51) Int. Cl.
*A01F 25/22*        (2006.01)

(52) U.S. Cl.
CPC .................................... *A01F 25/22* (2013.01)

(58) Field of Classification Search
CPC .. E04H 7/22; A01F 25/22; B65G 3/04; B65G 69/18; B65G 69/185; B65G 69/186
(Continued)

(56) References Cited

U.S. PATENT DOCUMENTS 4,214,511 A   *   7/1980   Mueller ................. B65D 90/36
                                     454/182
4,256,029 A      3/1981   Steffen
(Continued)

FOREIGN PATENT DOCUMENTS

CN      107950210 A   *   4/2018   .............. A01M 1/00
CN      109479534 A   *   3/2019   ......... A01F 25/2018
(Continued)

OTHER PUBLICATIONS

International Search Report and Written Opinion for International Application No. PCT/US23/24233 dated Oct. 16, 2023.
(Continued)

*Primary Examiner* — Andrew J Triggs
(74) *Attorney, Agent, or Firm* — Fitch, Even, Tabin & Flannery LLP

(57)                 ABSTRACT

A bin vent apparatus is described herein for use on a storage bin for agricultural products. The storage bin can have a sidewall and a roof defining an interior. The bin vent apparatus includes a plurality of discrete, roof-mounted vent filters. Each of the vents has an inlet for receiving air from an interior of the bin, an outlet for venting air from the vent, a fluid flow path between the inlet and the outlet, and one or more filters disposed in the fluid flow path between the inlet and the outlet to filter the air received from the interior of the bin. A fan is disposed in the flow path and downstream of the one or more filters, the fan being operable to cause air to flow into the inlet, through the filter, and out of the outlet.

21 Claims, 10 Drawing Sheets

(58)  Field of Classification Search
USPC ........................................................ 52/302.2
See application file for complete search history.

(56)                      References Cited

U.S. PATENT DOCUMENTS

| | | | | |
|---|---|---|---|---|
| 4,515,071 | A  * | 5/1985 | Zach ........................ | F26B 21/00 |
| | | | | 34/233 |
| 4,676,007 | A  * | 6/1987 | Good ........................ | F26B 9/02 |
| | | | | 34/233 |
| 5,338,325 | A  * | 8/1994 | Stanelle .............. | B01D 46/446 |
| | | | | 96/400 |
| 6,065,922 | A  * | 5/2000 | Kato ................... | B65G 69/186 |
| | | | | 141/93 |
| 10,433,490 | B2 * | 10/2019 | Trucke ...................... | E04H 7/24 |
| 2016/0264354 | A1 * | 9/2016 | Herman ............ | B01D 46/0041 |
| 2024/0407302 | A1 * | 12/2024 | Biggs ...................... | A01F 25/22 |

FOREIGN PATENT DOCUMENTS

| | | | | | |
|---|---|---|---|---|---|
| CN | 113207958 | A  * | 8/2021 | ............ | A01F 25/14 |
| KR | 100976188 | | 8/2010 | | |
| KR | 100976188 | B1 * | 8/2010 | ............ | A01F 25/14 |

OTHER PUBLICATIONS

Sean Pratt. Exhaust fan use rises along with drying trend. The
Western Producer. Jun. 3, 2021. [Aug. 20, 2023]. Retrieved from
internet: <https://www.producer.com/crops/exhaust-fan-use-rises-
along-with-drying-trend/>.

* cited by examiner

BIN VENT APPARATUS AND METHODS

FIELD

Bin vent apparatuses and methods are described herein and, in particular, bin vent apparatuses and methods that filter dust-laden air from within the bin.

BACKGROUND

Agricultural bins are storage structures for grains and sometimes for other agricultural products. The bins can vary in size from relatively small bins such as would be used at single small farm, to very large bins, such as for a cooperative group of farms. Some bins exceed 80 feet in height and have a diameter at the base of 135 feet. Such bins can hold in excess of 1 million bushels of grain. These bins typically have a cylindrical sidewall and a low-angled, conical roof.

Stored grain in a bin can be aerated to maintain proper grain conditions and reduce grain spoilage. Some bins have fans exteriorly mounted at a bottom portion of the sidewall. The fans can be configured for introducing air into the grain, with air from within the bin being discharged from passive roof-top vents, such as those shown in the conventional bin depicted in FIG. 1. The passive roof-top vents can simply be air plenums or openings with no mechanically operable components.

The bins are typically fed with grain or other flowable food products from an infeed location at the top, such as by using a conveyor to direct the grain to the infeed opening in the roof where it can pour into the bin. Grain dust is generated during filling, and conventionally a vent filter device is used at the infeed point to mitigate dust egress from the bin. To reduce dust-laden air from exiting through passive roof-top vents, one solution is the use of a baghouse dust collector. A baghouse dust collector can include equipment positioned adjacent the bottom portion of the sidewall of the bin for evacuating and filtering dust-laden air from within the bin prior to discharge of the air. A system with a baghouse dust collector may include one or more suction ducts on the roof of the bin, as shown in FIG. 2, that are connected to the baghouse dust collector. An example of a conventional baghouse dust collector is one of the RF series of collectors manufactured by Donaldson Company, Inc. (Minneapolis, MN).

The use of such suction ducting and the baghouse dust collector can undesirably add to the cost and construction of a grain storage bin. Further, grain dust can accumulate in the ducting, leading to less efficient operation of the baghouse dust collector and even clogging. Cleaning of the ducting can be challenging given that the ducting typically is installed on the roof of the bin so as to require disassembly of sections of the ducting.

SUMMARY

A storage bin for agricultural products comprising an interior bounded by a cylindrical sidewall and a roof is described herein. A plurality of discrete vent filters are attached to the roof. Each of the vent filters includes an inlet for receiving air from an interior of a bin, an outlet for venting air from the vent filter, a fluid flow path between the inlet and the outlet, and one or more filters disposed in the fluid flow path between the inlet and the outlet to filter the air received from the interior of the bin. A fan is operatively disposed in the flow path in each case and is selectively operable to cause air to flow into the inlet, through the filter, and out of the outlet.

A method is described herein of filling a grain storage bin having an interior bounded by a cylindrical sidewall and a roof. The method includes, at a plurality of discrete outlet locations on the roof, aspirating the bin by pulling air from the interior of the bin through a vent filter during a filling operation and thereby venting the filtered air. The method can include using a plurality of vent filters attached to the roof, with each of the vent filters including an inlet for receiving air from an interior of a bin, an outlet for venting air from the vent, a fluid flow path between the inlet and the outlet, and one or more filters disposed in the fluid flow path between the inlet and the outlet to filter the air received from the interior of the bin. Again, a fan is operatively disposed in the flow path and is selectively operable to cause air to flow into the inlet, through the filter, and out of the outlet.

BRIEF DESCRIPTION OF THE DRAWINGS

FIG. 6 is a schematic representation of a cross-sectional view of the bin of FIG. 3, showing an optional rotary distributor in the interior of the bin;

FIG. 7 is a perspective view of an exemplary vent filter for use on the bin of FIG. 3;

DETAILED DESCRIPTION

A storage bin 10 for agricultural products and having a plurality of discrete, roof-mounted vent filters 20 configured for venting dust-laden air from an interior 12 of the bin 10 and filtering the dust-laden air prior to discharge is described herein and illustrated in the accompanying non-limiting, exemplary embodiments of FIGS. 3-10. Advantageously, the use of discrete, roof-mounted vent filters 20 for venting and filtering air from the interior 12 of the bin 10 can reduce the need for the complicated suction ductwork associated with a baghouse dust collector and the collector itself. The vent filters 20 are generally used during filling of the grain bin, which is when dust tends to be generated. It is contemplated that the vent filters 20 also or alternatively may be used during aeration of grain in the bin after filling.

Figure 1:
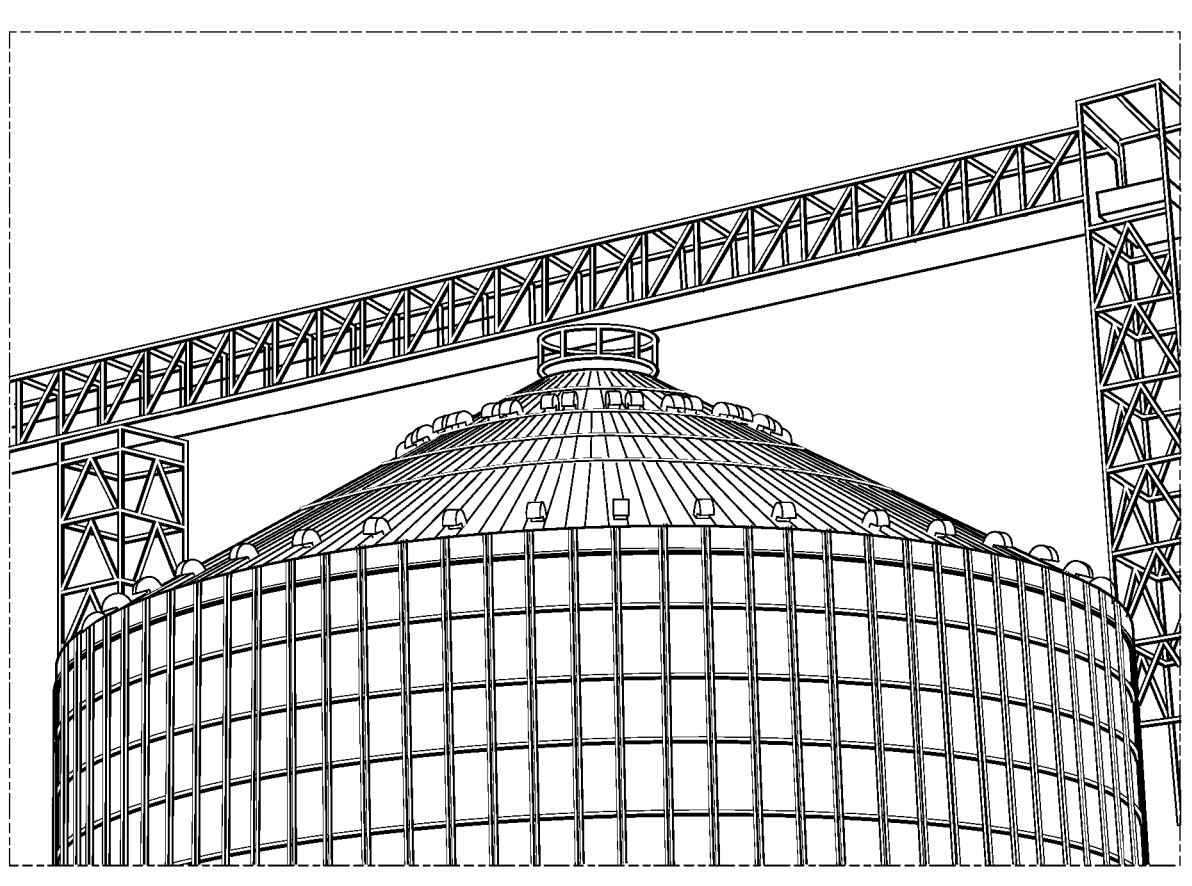
FIG. 1 is a partial perspective view of a prior art grain bin having a sidewall and roof with many inlet vents disposed on the roof.
Figure 2:
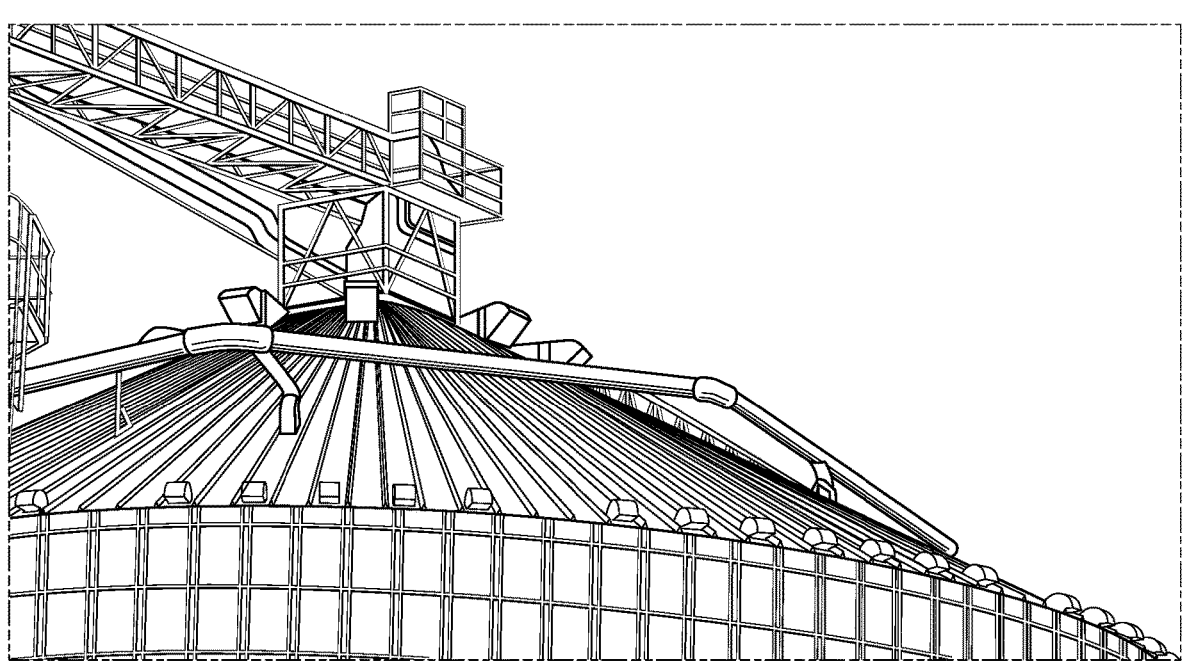
FIG. 2 is a partial perspective view of another prior art grain bin having a sidewall and roof with many inlet vents disposed on the roof, as well as a ducting for ventilating from an interior of the bin to a baghouse dust collector.

The storage bin 10 includes a cylindrical sidewall 14 and a generally frustoconical roof 16, as shown in FIGS. 3-6, which in part define or bound the interior 12 of the bin 10. The roof 16 does not have to be a perfect frustoconical shape; for example, deviations in angles along the slope of the roof can be present. In most cases, though, the conic angle of the roof is constant. The sidewall 14 and roof 16 can be of conventional construction, typically metal. The apex of the roof 16 can be truncated and can have a fill opening or infeed 18 through which grain or other agricultural products can be poured into the bin 10. For example, a conveyor (see FIGS. 1 and 2) can be utilized to pour grain into the interior 12 of the bin 10 via the fill opening 18.

Figure 9:
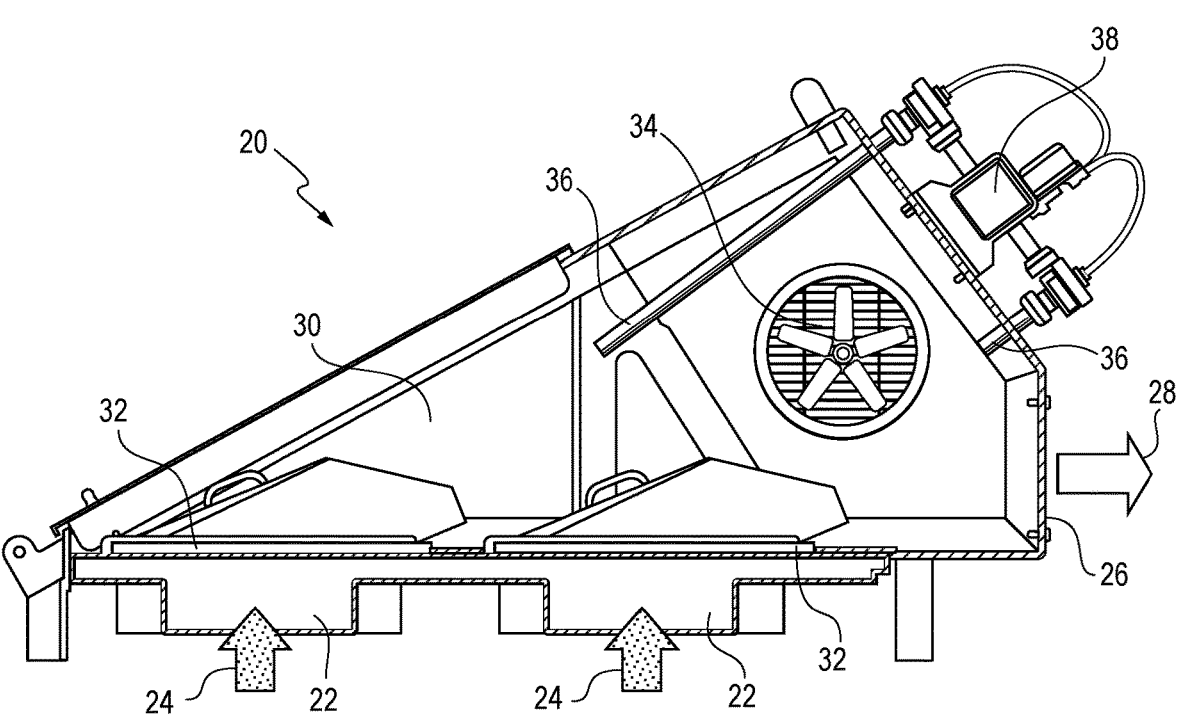
FIG. 9 is a side sectional view of an exemplary vent filter for use on the bin of FIG. 3, showing air flow in a venting operation.
Figure 10:
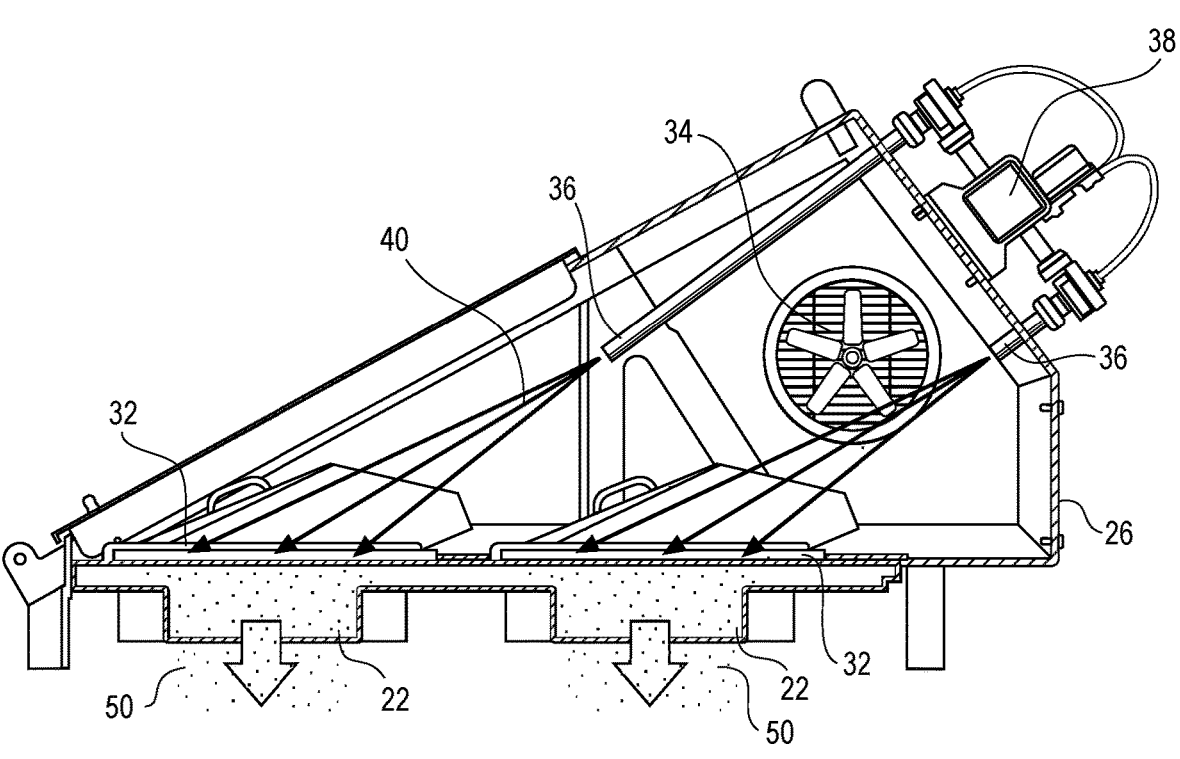
FIG. 10 depicts the exemplary vent of FIG. 9, showing air flow in a filter cleaning operation.

With reference to FIGS. 9 and 10, the vent filters 20 each include an inlet 22 for receiving dust-laden air 24 from the interior 12 of the bin 10, an outlet 26 for venting filtered air 28 from the vent 20, a fluid flow path 30 between the inlet 22 and the outlet 26, and one or more filters 32 disposed in the fluid flow path 30 between the inlet 22 and the outlet 26 to filter the dust-laden air 24 received from the interior 12 of the bin 10. While FIGS. 9 and 10 are illustrated with a pair of inlets 22 and a pair of filters 32, it is contemplated that the vent filter 20 may include one inlet and one filter, or more than two inlets and more than two filters.

The vent filters 20 also include a fan 34 disposed in the flow path 30 and downstream of the one or more filters 32, it being contemplated in other embodiments that a fan upstream of the filters might be employed. The fan 34 is selectively operable to cause dust-laden air 24 to flow through a vent opening in the roof 16, into the inlet 22, through the filter 32, and then filtered air 28 out of the outlet 26. The fan 34 can include an electric or other motor for rotating blades of the fan 34. The fan 34 can be electronically controlled via a control system (not separately shown) that may include automated control devices such as logic controllers. Preferably, though not necessarily, each filter 32 can be removed from the plenum of the vent 20 via an exterior of the vent 20 for cleaning and/or replacement. The filters 32 may be of conventional construction, such as fibrous screen filters.

Each of the vent filters 20 is discrete from others of the vents; in other words, each of the vent filters 20 has its own filter 32 and fan 34. Optionally, each of the fans 34 can be operated independently from others of the fans 34. This allows for some, but not all, of the vent filters 20 to be operated, which can be advantageous depending upon conditions such as wind direction or other atmospheric conditions or fill level of the bin. The vent filters 20 can all be configured to operate together. In other words, the vent filters 20 can be wired or otherwise controlled such that they are all either on or off. In other embodiments, the vent filters may be controlled independently or in groups.

Figure 11:
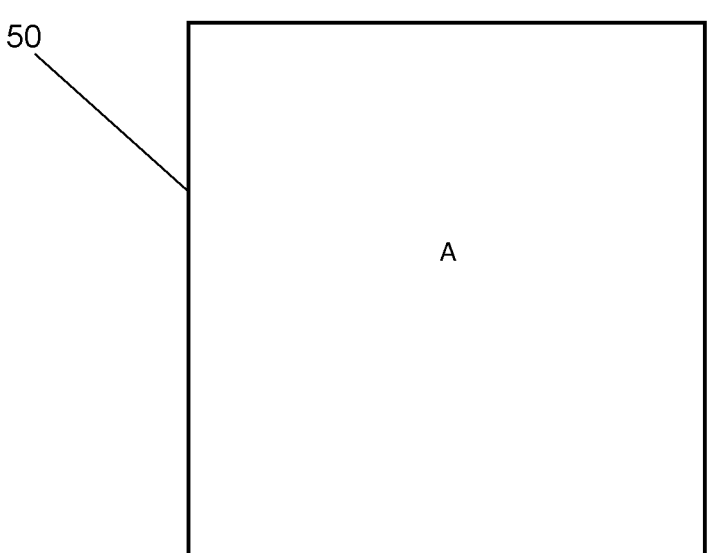
FIG. 11 is a representation of a pressure sensor and actuator as described hereinbelow.
Figure 11:
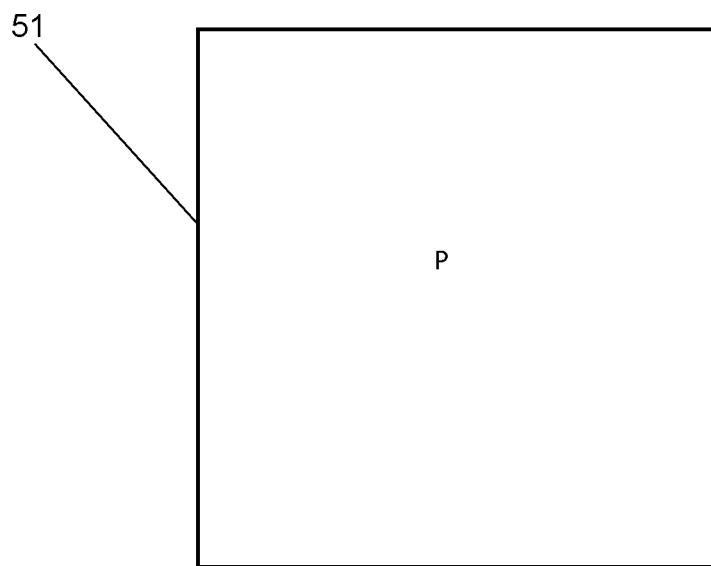

Optionally, each of the vent filters 20 includes one or more pressurized air nozzles 36 that are directed toward the filter 32 on a downstream side thereof and in fluid communication with a source of pressurized air 38 for cleaning particulates 50 from the filter 32 using the pressurized air 40. The source of pressurized air 38 can be shared among some or all of the vent filters 20. The vent filters 20 can be operated such that a pressure drop across the plenum of the vent filter ranges from about 2 in water column to about 4 in water column, the pressurized air being actuated when the pressure drop meets or exceeds 4 in water column to clean the filter apparatus and being deactuated when the pressure drop across the plenum reaches 2 in water column or below. A pressure sensor 50 and corresponding actuator device 51 as shown in FIG. 11 may be employed for this purpose.

Figure 7:
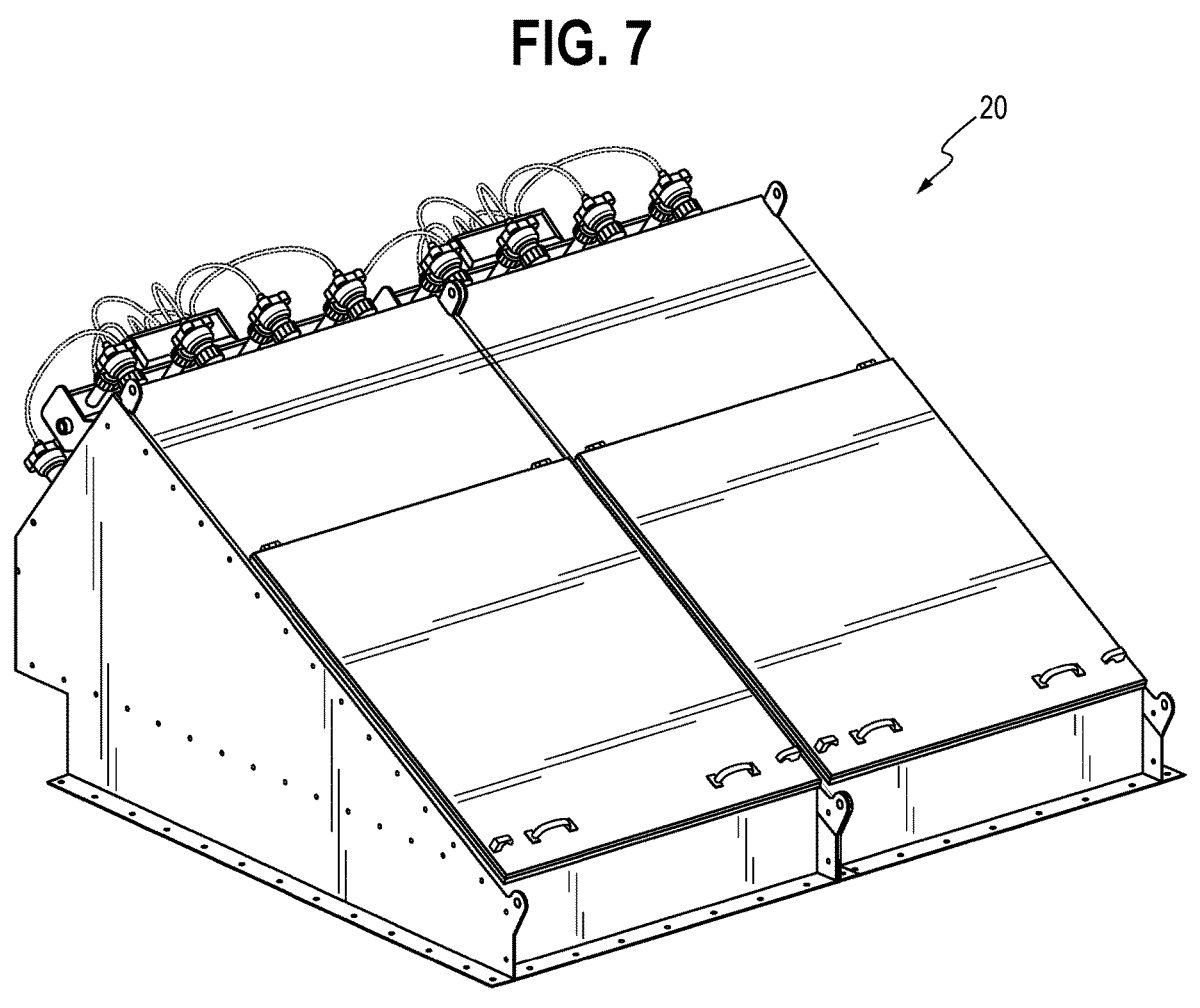
Figure 8:
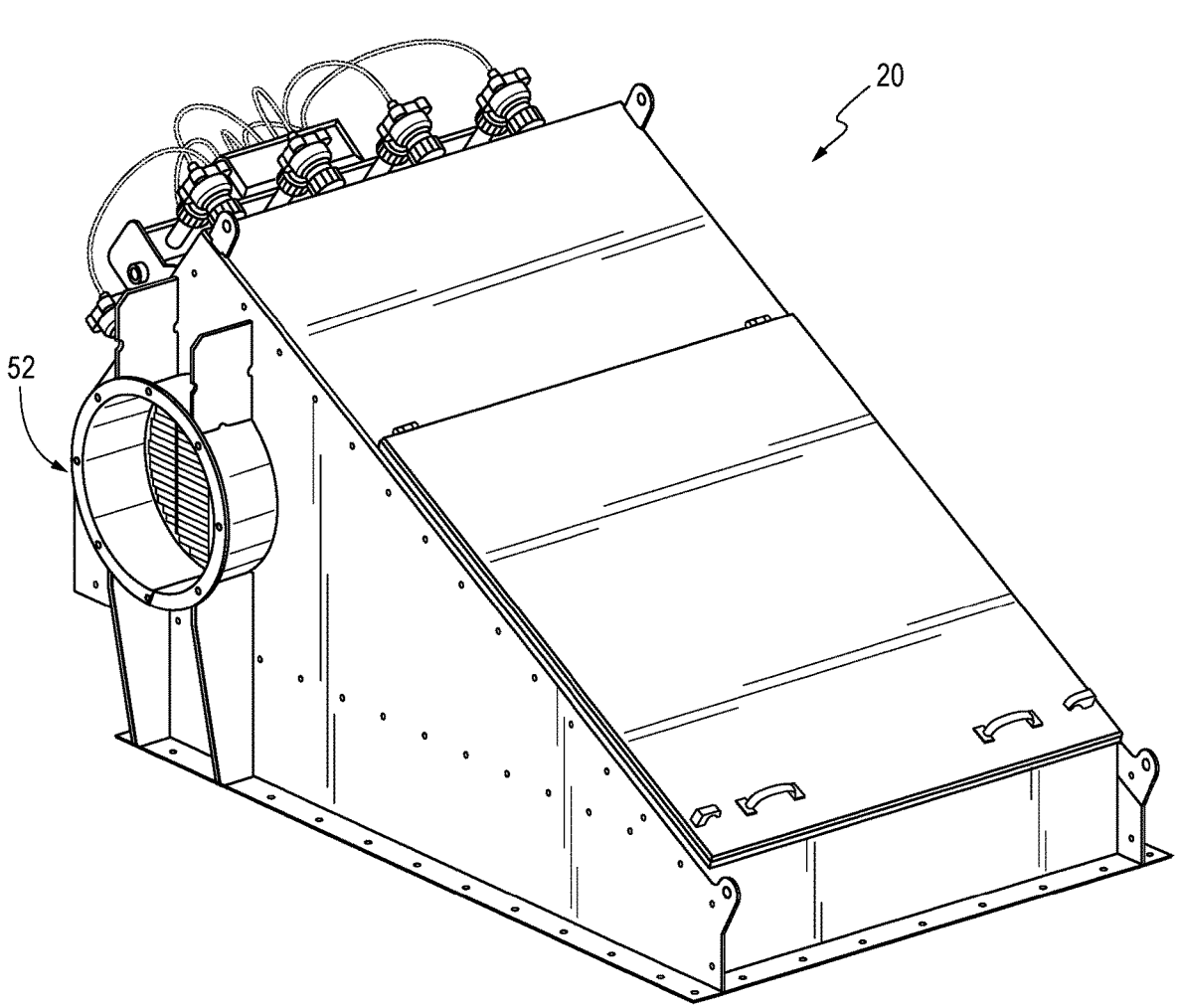
FIG. 8 is a perspective view of an exemplary vent filter for use on the bin of FIG. 3.

Exemplary embodiments of the vent filters 20 shown in FIGS. 7 and 8 are commercially available from Donaldson Company, Inc. (Minneapolis, MN) as model no. CPV-6, although other vents and vent sizes can also be suitable. The vent filter 20 depicted in FIGS. 7 and 8 have an inlet, an outlet, and a filter (not shown) therebetween. The vent filter 20 also has a filter cleaning system, whereby pressurized air from a pressurized source of air can be directed onto a downstream side of the filter to clean the filter, such as described above with respect to FIGS. 9 and 10. The vent filter 20 illustrated in FIG. 8 includes a mounting region 52 for a motorized fan (not shown) that draws air from the inlet, through the filter and out of the outlet.

In operation, one or more of the plurality of discrete, roof-mounted vent filters 20 can be actuated to pull dust-laden air 24 from the interior 12 of the bin 10 and through the filter 32 to reduce or remove dust from the air before venting such filtered air 28 to ambient. More specifically, the fans 34 of each of the vent filters 20 can be operated, individually, in groups, or cumulatively, to cause the dust-laden air 24 to flow into the inlet 22 from the interior 12 of the bin 10, through the filter 32 and then discharge filtered air 28 out of the outlet 26, as shown in FIG. 6, thereby aspirating the bin.

As described above, optionally, pressurized air 40 from the source of pressurized air 38 can be directed toward the filter 32 on a downstream side thereof using the one or more pressurized air nozzles 36 to blow dust from the filter to clean the filter 32. Although the fan 34 can be non-operable during such cleaning, it may also be operable while pressurized air 40 is directed toward the filter 32.

Figure 3:
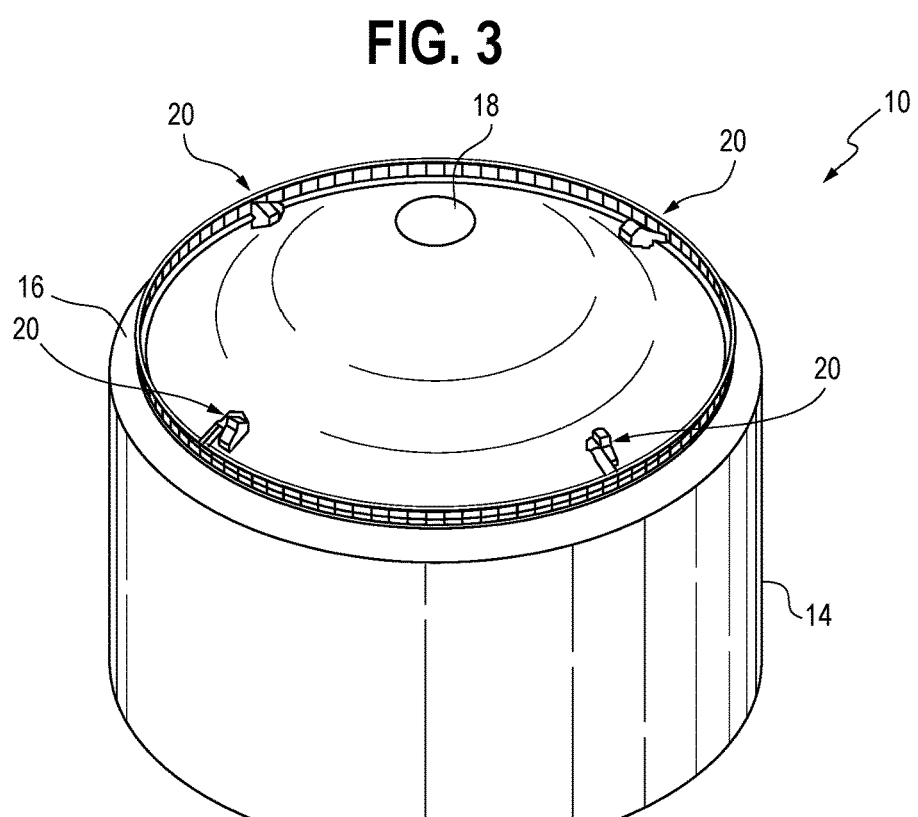
FIG. 3 is a perspective view of a storage bin for agricultural products, the bin having a cylindrical sidewall and a conical roof bounding an interior, and a plurality of discrete, roof-mounted vent filters mounted to the roof for venting and filtering air from the interior of the bin.
Figure 4:
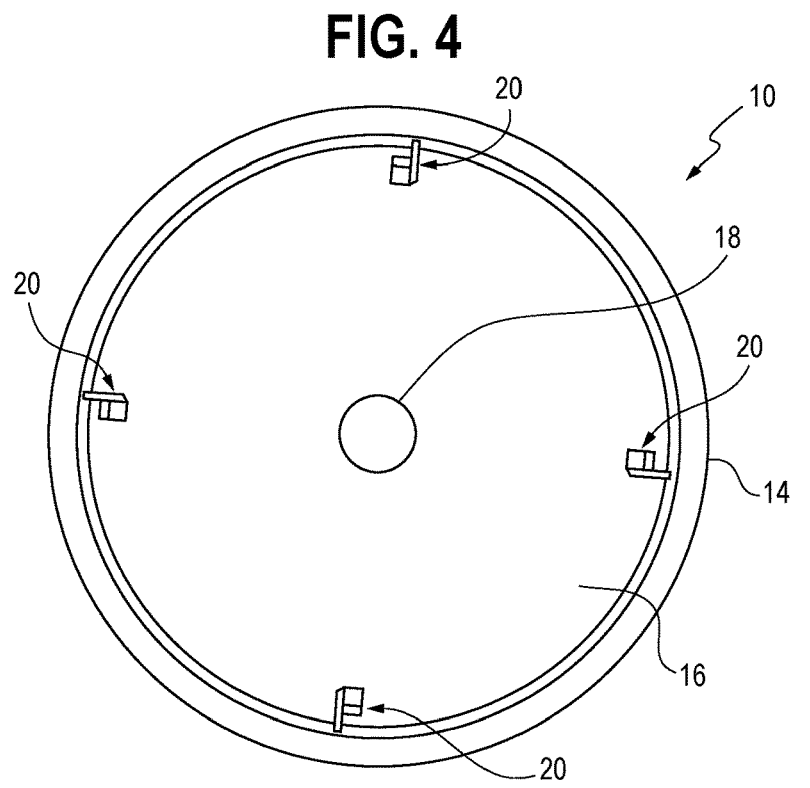
FIG. 4 is a top plan view of the bin of FIG. 3.
Figure 5:
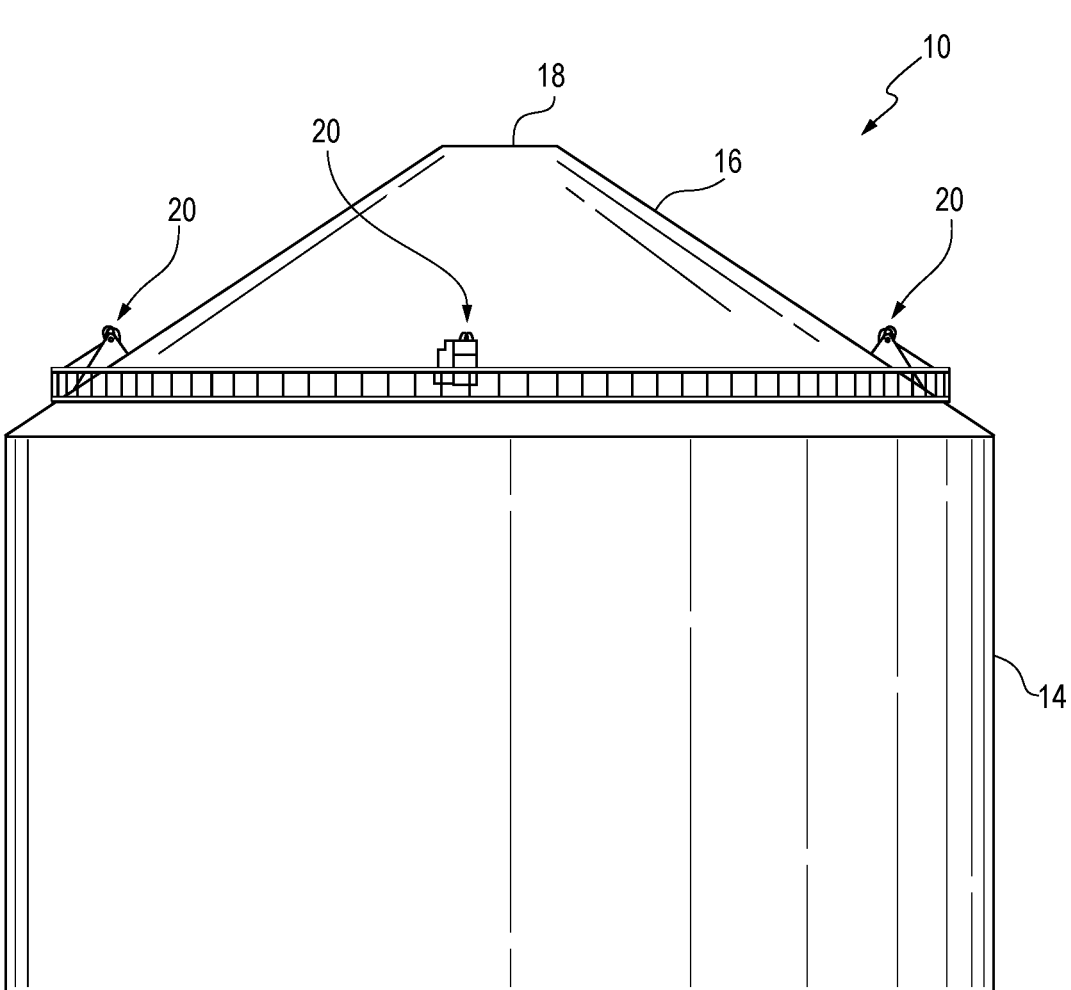
FIG. 5 is a front elevation view of the bin of FIG. 3.

Although four such vent filters 20 are depicted in the embodiment of FIGS. 3-5, it will be understood that any suitable number of vent filters 20 can be used. For example, four or more vent filters 20 may be used, sixteen or fewer vent filters 20 may be used, between four and sixteen vent filters 20 may be used, or greater than sixteen vent filters 20 may be used. The number of vent filters 20 can be a function at least in part of the volume and flow rate of air desired to be vented, as well as the flow capacity of a given vent filter. The number of vent filters 20 can be readily increased based upon observed conditions. For example, if the filters 32 are becoming dust-laden too quickly, another vent filter 20 can be added to the roof 16 at relatively low expense. Moreover, if there are more vent filters 20 than needed at a particular loading level for the bin, then one or more of the vent filters 20 need not be actuated, or the extra vent filter may be removed for use in another grain bin. The ability to add vent filters to the system or to bring vent filters offline when not needed lends more flexibility to the arrangement than the heretofore-described conventional system using a baghouse and suction ducts.

Figure 6:
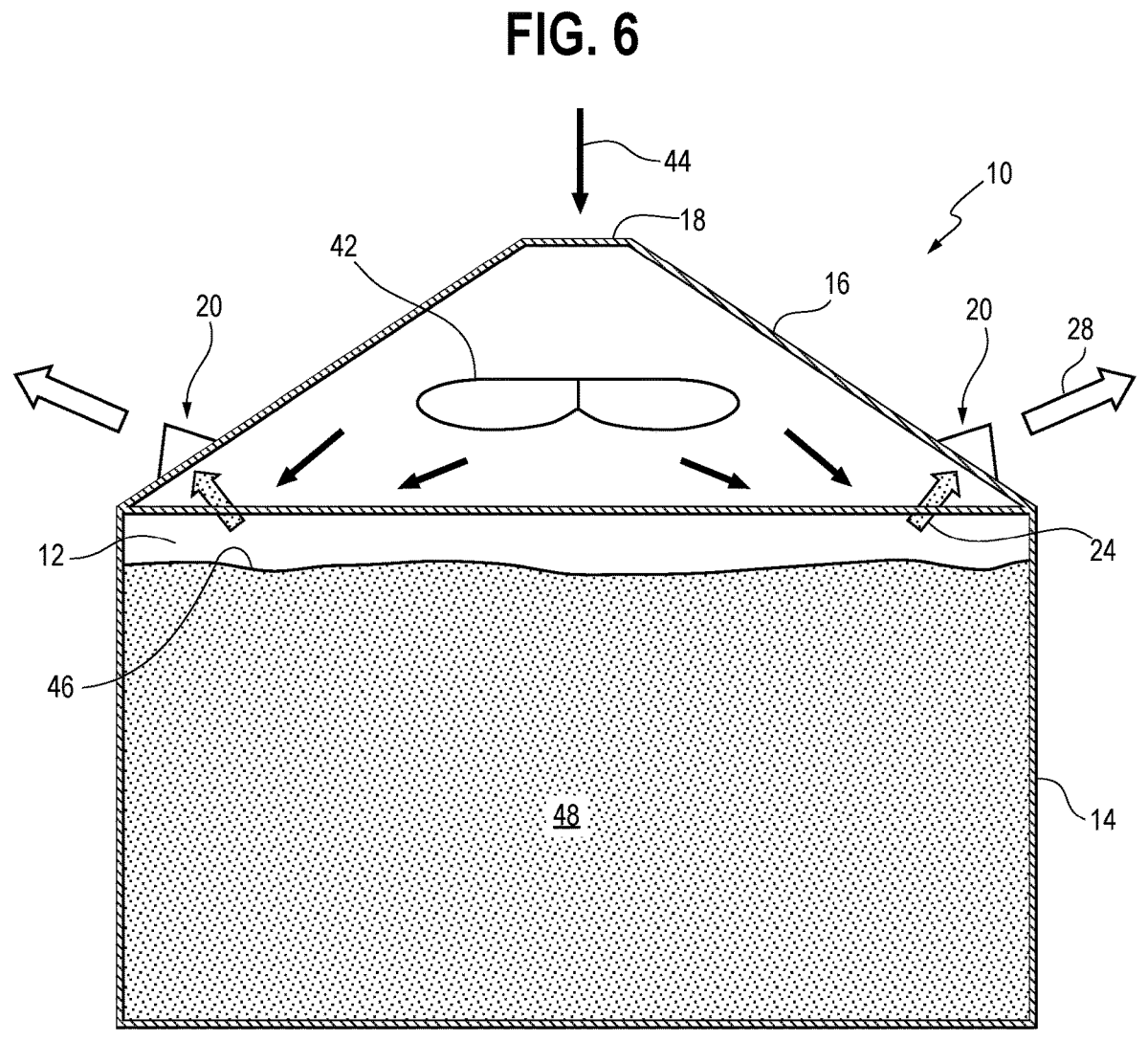

As shown schematically in FIG. 6, the storage bin 10 may include an optional rotary distributor 42. The rotary distributor 42 is positioned with the interior 12 of the bin 10 and, preferably, within a portion of the interior 12 above the sidewall 14 and within the roof 16. The rotary distributor 42 is positioned such that the flow 44 of incoming grain or other agricultural products is at least partially spread radially outward. The optional rotary distributor 42, if present, can be used to help with keeping a generally level upper surface 46 of the grain 48, as compared to simply pouring the grain which can result in a domed or higher middle as compared to periphery of the upper surface of the grain. Preferably, though not necessarily, the upper surface 46 of the grain 48 is below an intersection of the roof 16 and the sidewall 14, as shown in FIG. 6.

The vent filters 20 described herein may be retrofit onto an existing bin, for example, one that employs a baghouse dust collector and suction ducting as described herein. These vents may be used to supplement the dust removing properties of the baghouse, or to replace the baghouse dust collector entirely. In other embodiments, the vent filters 20 may be incorporated into a newly built bin, preferably one in which a baghouse dust collector and associated suction ducting is not used.

Conventional bins include plural open, passive vents that allow air to escape the bin during aeration of the grain. Such passive vents are illustrated in the prior art grain bin shown in FIG. 1. Dust-laden air sometimes escapes from these vents in conventional bins. The inventive bins 20 described herein may continue to include such open, passive vents. An advantage of the use of the roof-mounted vent filters vent filters 20 described herein is that the powered fans 34 will drive air from the bin 10, and consequently will lead to a negative (inward) pressure at the open, passive vents as air is replaced in the bin 10 especially during a filling operation. This negative pressure can advantageously impede the escape of dust from the open, passive vents. This can be beneficial during various conditions, such as during filling when grain dust generation is increased.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

The invention claimed is:

1. A storage bin for agricultural products comprising an interior bounded by a cylindrical sidewall and a roof; an infeed opening in the roof through which agricultural products can be fed into the bin, at least one additional roof opening separate from the infeed opening; and a plurality of discrete, roof-mounted vent filters, each of the vent filters including an inlet for receiving air from the interior of the bin, wherein the inlet of each of the vents is connected to an associated opening in the roof, an outlet for venting air from the vent, a fluid flow path between the inlet and the outlet, and one or more filters disposed in the fluid flow path between the inlet and the outlet to filter the air received from the interior of the bin, and a fan disposed in the flow path and downstream of the one or more filters, the fan being selectively operable to cause air to flow into the inlet, through the filter, and out of the outlet; wherein each of the vent filters includes one or more pressurized air nozzles directed toward the filter on a downstream side thereof and in fluid communication with a source of pressurized air for cleaning the filter using pressurized air.

2. The storage bin of claim 1, wherein the plurality of discrete, roof-mounted vent filters includes four or more vent filters.

3. The storage bin of claim 2, wherein the plurality of discrete, roof-mounted vent filters includes sixteen or fewer vent filters.

4. The storage bin of claim 1, wherein the plurality of discrete, roof-mounted vent filters includes four or more vent filters and wherein the roof is a generally frustoconical.

5. The storage bin of claim 1, further comprising a rotary agricultural product distributor.

6. The storage bin of claim 1, wherein a baghouse dust collector is not used.

7. The storage bin of claim 1, wherein the grain bin includes a plurality of passive vents.

8. The storage bin of claim 1, including a pressure sensor an actuator responsive to said pressure sensor for actuating said one or more pressurized air nozzles when a pressure differential across said vent filter reaches a predetermined level.

9. The storage bin of claim 1, including a plurality of passive vents.

10. A method of aspirating the grain bin of claim 1, the method comprising, with respect to one or more of the plurality of discrete, roof-mounted vent filters, operating the fan to cause air to flow into the inlet from the interior of the bin, through the filter and out of the outlet.

11. The method of claim 10, the aspiration being performed during filling of the bin with a grain.

12. The method of claim 10, further comprising directing pressurized air from the source of pressurized air toward the filter on a downstream side thereof using the one or more pressurized air nozzles.

13. The method of claim 10, including actuating the pressurized air upon sensing that a pressure differential across said vent filter has reached a predetermined level.

14. A storage bin for agricultural products comprising an interior bounded by a cylindrical sidewall and a roof; an infeed opening in the roof through which agricultural products can be fed into the bin, at least one additional roof opening separate from the infeed opening; and a plurality of discrete, roof-mounted vent filters, each of the vent filters including, within a housing, an inlet for receiving air from an interior of a bin, wherein the inlet of each of the vents is connected to an associated opening in the roof, an outlet for venting air from the vent, a fluid flow path between the inlet and the outlet, and plural discrete filters disposed in the fluid flow path between the inlet and the outlet to filter the air received from the interior of the bin, and a fan disposed in the flow path and downstream of the filters, the fan being selectively operable to cause air to flow into the inlet, through the filters, and out of the outlet.

15. The storage bin of claim 14, wherein each of the vent filters includes one or more pressurized air nozzles directed toward the filter on a downstream side thereof and in fluid communication with a source of pressurized air for cleaning the filter using pressurized air.

16. The storage bin of claim 15, further comprising a rotary distributor disposed within the interior for dispersing agricultural products fed into the bin view the infeed opening.

17. The storage bin of claim 15, including a plurality of passive vents.

18. The storage bin of claim 14, wherein the plurality of discrete, roof-mounted vent filters includes four or more vent filters; and wherein the roof is a generally frustoconical.

19. The storage bin of claim 1, including a plurality of passive vents.

20. A method comprising building a storage bin for agricultural products, the storage bin comprising an interior bounded by a cylindrical sidewall and a roof; an infeed opening in the roof through which agricultural products can be fed into the bin, at least one additional roof opening separate from the infeed opening; and a plurality of discrete, roof-mounted vent filters, each of the vent filters including, within a housing, an inlet for receiving air from an interior of a bin, wherein the inlet of each of the vents is connected to an associated opening in the roof, an outlet for venting air from the vent, a fluid flow path between the inlet and the outlet, and plural discrete filters disposed in the fluid flow path between the inlet and the outlet to filter the air received from the interior of the bin, and a fan disposed in the flow path and downstream of the filters, the fan being selectively operable to cause air to flow into the inlet, through the filters, and out of the outlet.

21. The method of claim 20, including a plurality of passive vents.

* * * * *